(12) United States Patent
Del Rossa

(10) Patent No.: US 10,260,663 B2
(45) Date of Patent: Apr. 16, 2019

(54) EGR PIPE REPAIR KIT

(71) Applicant: Jeffrey Del Rossa, Pittsburgh, PA (US)

(72) Inventor: Jeffrey Del Rossa, Pittsburgh, PA (US)

( * ) Notice: Subject to any disclaimer, the term of this patent is extended or adjusted under 35 U.S.C. 154(b) by 9 days.

(21) Appl. No.: 15/157,820

(22) Filed: May 18, 2016

(65) Prior Publication Data

US 2016/0339573 A1 Nov. 24, 2016

Related U.S. Application Data

(60) Provisional application No. 62/163,145, filed on May 18, 2015, provisional application No. 62/204,635, filed on Aug. 13, 2015.

(51) Int. Cl.
*F02M 26/11* (2016.01)
*F16L 23/00* (2006.01)

(52) U.S. Cl.
CPC ............ *F16L 23/003* (2013.01); *F02M 26/11* (2016.02)

(58) Field of Classification Search
CPC ......... F02M 26/00–26/74; F16L 23/00–23/24; F16L 55/18; Y10T 16/05; Y10T 408/567; B23B 49/023; B23B 49/026; B23B 49/00; B23B 47/281; B23B 47/28; B23B 47/284; B23B 2247/112; B23B 2247/12; B23B 2247/14

See application file for complete search history.

(56) References Cited

U.S. PATENT DOCUMENTS

| | | | | |
|---|---|---|---|---|
| 1,372,378 A | * | 3/1921 | Walker | B23B 47/28 408/115 R |
| 2,272,861 A | * | 2/1942 | Yohpe | F16L 41/008 285/368 |
| 2,373,918 A | * | 4/1945 | Schoeniger | B23B 47/28 408/104 |
| 2,412,459 A | * | 12/1946 | Stull | B23B 47/28 408/115 R |
| 2,767,677 A | * | 10/1956 | Johnson | B23K 37/0536 269/48.1 |
| 2,825,143 A | * | 3/1958 | Polivka | B23B 47/28 33/520 |
| 3,257,896 A | * | 6/1966 | Mills, Sr. | G01B 11/26 356/138 |
| 3,363,488 A | * | 1/1968 | Thau | B23B 47/28 29/426.4 |
| 3,498,643 A | * | 3/1970 | Reiss | F16L 23/0286 285/189 |
| 3,799,687 A | * | 3/1974 | Anderson | B23B 41/12 408/709 |
| 3,830,585 A | * | 8/1974 | Nakada | B23B 47/28 408/79 |

(Continued)

FOREIGN PATENT DOCUMENTS

GB 918574 A * 2/1963 ........... B23B 49/023

*Primary Examiner* — Tyrone V Hall, Jr.
(74) *Attorney, Agent, or Firm* — Buchanan Ingersoll & Rooney PC

(57) ABSTRACT

An improved apparatus for repairing pipes and tubes, such as EGR pipes, is disclosed. The apparatus can be readily mounted to the pipe or tube via a flange that fits inside the pipe or tube and thus generally avoids the need to remove any adjacent components. The apparatus further provides holes or bushings that allow for the precise alignment of various repair tools.

16 Claims, 6 Drawing Sheets

(56) References Cited

U.S. PATENT DOCUMENTS

| | | | | |
|---|---|---|---|---|
| 3,912,306 A * | 10/1975 | McCormick | F01N 13/1805 | 285/12 |
| 4,011,024 A * | 3/1977 | Nakano | B23B 47/28 | 408/111 |
| D254,074 S * | 1/1980 | Ringle | | D15/138 |
| 4,481,930 A * | 11/1984 | Chadwick | F02M 5/12 | 123/495 |
| 4,544,307 A * | 10/1985 | Miller | B23B 47/28 | 408/115 B |
| 4,730,852 A * | 3/1988 | Arscott | F01N 13/18 | 285/15 |
| 4,809,751 A * | 3/1989 | McKenzie | F16L 55/1286 | 138/89 |
| 5,284,406 A * | 2/1994 | Mueller | B23B 47/28 | 408/241 B |
| 5,546,834 A * | 8/1996 | Gable | B25B 13/48 | 81/53.2 |
| 5,641,185 A * | 6/1997 | Harth | F01N 13/1805 | 24/284 |
| 5,961,153 A * | 10/1999 | Foster | F01N 13/08 | 180/309 |
| 5,988,955 A * | 11/1999 | Curtis | B23B 47/28 | 408/115 R |
| H1887 H * | 10/2000 | Fuller | | 408/103 |
| 6,170,530 B1 * | 1/2001 | Steblina | F16L 55/132 | 138/89 |
| 6,435,781 B1 * | 8/2002 | Jones | B23B 49/02 | 29/426.4 |
| 7,784,150 B2 * | 8/2010 | Anderson | B61D 3/18 | 105/355 |
| 8,777,278 B2 * | 7/2014 | Singh | F01N 13/1805 | 285/368 |
| 9,132,487 B2 * | 9/2015 | Beydler | B23B 49/026 | |
| 2005/0132532 A1 * | 6/2005 | Campbell | E05D 15/0682 | 16/2.4 |
| 2009/0064454 A1 * | 3/2009 | Anderson | B61D 3/18 | 16/2.1 |

* cited by examiner

EGR PIPE REPAIR KIT

RELATED APPLICATIONS

This application claims the benefit of U.S. Provisional Patent Application No. 62/163,145, filed on May 18, 2015, and U.S. Provisional Patent Application No. 62/204,635, filed on Aug. 13, 2015, the contents of both are incorporated herein by reference.

FIELD OF THE INVENTION

The present invention generally relates to an apparatus for repairing pipes and tubes such as an exhaust gas recirculating valve and surrounding assemblies.

BACKGROUND OF THE INVENTION

Internal combustion engines often have an exhaust gas recirculation (EGR) assembly that recycles a portion of an engine's exhaust gas back into the engine cylinders. This exhausted gas is at a much higher temperature than intake air, which dilutes the air in the cylinders and absorbs some of the combustion heat in order to reduce the temperature inside the cylinders. The EGR pipe and EGR valve regulate the gas recirculation of fuel exhaust by monitoring temperatures and exhaust emissions. EGR assemblies can be used in both gas and diesel engines.

EGR valves and surrounding assemblies require regular maintenance to ensure proper fuel combustion and to maintain low engine emission standards as designed. Due to repetitive hot and cold duty cycles, which are amplified during more strenuous engine use, such as towing, plowing, and hauling, engine temperatures change dramatically. These temperature changes cause linear expansion and contraction of the EGR assembly and corresponding EGR pipe flange mounting that can exceed the tensile strength of the common fasteners that connect the EGR assembly to the remaining engine components. Exposed to variations in climate, temperature, moisture, and contaminates, the EGR valve and corresponding assemblies often need service or replacement when certain conditions are present, such as fuel injector failure, turbocharger failure, or the EGR valve pipe or other associated assemblies that handle exhaust emissions are replaced.

Currently, removing and repairing the EGR pipe involves removing fastener bolts on both the EGR valve and the exhaust manifold. Often, a technician is unable to remove the bolts due to corrosion and contaminants as well as expansion and contraction of key components that seize the fastener inside the manifold. Technicians struggle and can damage the retaining bolts that retain the EGR pipe/valve making the exhaust manifold or EGR value irreparable/nonusable. To replace or repair the EGR assembly, the technician must remove key engine components, such as the intake manifold, turbocharger, and in cases of a broken mounting fastener, the exhaust manifold. This process is time consuming, creates the risk of exposing the internal engine components to dirt and other contaminants, and creates the risk of breaking components and fasteners.

Thus, there is a need for a simpler and more cost-effective means for repairing EGR pipes and manifolds. Moreover, these problems are not unique to EGR pipes and manifolds. They also exist in other circumstances that involve tubes or pipes located in complex, bulky, or crowded apparatuses, machines, structures, or assemblies.

SUMMARY OF THE INVENTION

The present invention addresses some of the issues regarding the time, ease, and expense of repairing pipes such as EGR pipes and manifolds (as well as other types of pipes and valves) by providing a simple device that can facilitate the repair in situ and generally without the need to remove too many components in and around an engine or assembly.

Embodiments of the disclosed invention avoid or minimize some of these issues by facilitating and mating the precise alignment of repair tools to the exhaust manifold itself to repair damaged or broken fasteners and facilitate machining of the old fasteners for replacement with the new ones while the EGR assembly and mating components remain fixed in the vehicle.

While embodiments of the present invention have been designed to repair broken flange fasteners in Ford 6.7 liter diesel engines, the invention is not limited to this precise engine, type of engine, or part. One of ordinary skill in the art would recognize that the invention can be used with a variety of different types and makes of engines (diesel, gas, or otherwise) or a variety of different pipes or valves through simple variations on the principles disclosed.

In one embodiment, an apparatus for repairing a pipe, comprising a body with a top surface and a bottom surface; a repair hole located in the body; a mounting hole located in the body; a flange protruding from the bottom surface of the body about the mounting hole; and an arbor extending through the flange and the mounting hole.

In another embodiment, an apparatus for repairing a pipe, comprising a body with a top surface and a bottom surface, wherein the body is generally rhomboid in shape; two repair holes located in the body; a mounting hole located in the body; two mounting pins extending from the top surface of the body; a flange protruding from the bottom surface of the body about the mounting hole, wherein the flange has a plurality of slots; an arbor extending through the flange and the mounting hole, wherein the arbor is comprised of a threaded end and a frustoconical end; and a nut attached to the threaded end of the arbor.

In yet another embodiment, an apparatus for repairing a pipe, comprising a body with a surface; a repair hole located in the body; a mounting hole located in the body; a flange protruding from the surface of the body about the mounting hole; and a plug inserted into the mounting hole.

In yet another embodiment, an apparatus for repairing a pipe, comprising a body with a surface; a repair hole located in the body; a mounting hole located in the body; a flange protruding from the surface of the body about the mounting hole; a plug inserted into the mounting hole; and a bushing configured to fit inside the repair hole; wherein the bushing is generally cylindrical in shape with a flattened portion along the circumference of the bushing; wherein the body is generally rhomboid in shape; wherein the repair hole is generally rectangular in shape; and wherein the flange contains a plurality of slots.

DESCRIPTION OF THE INVENTION

Figure 1:
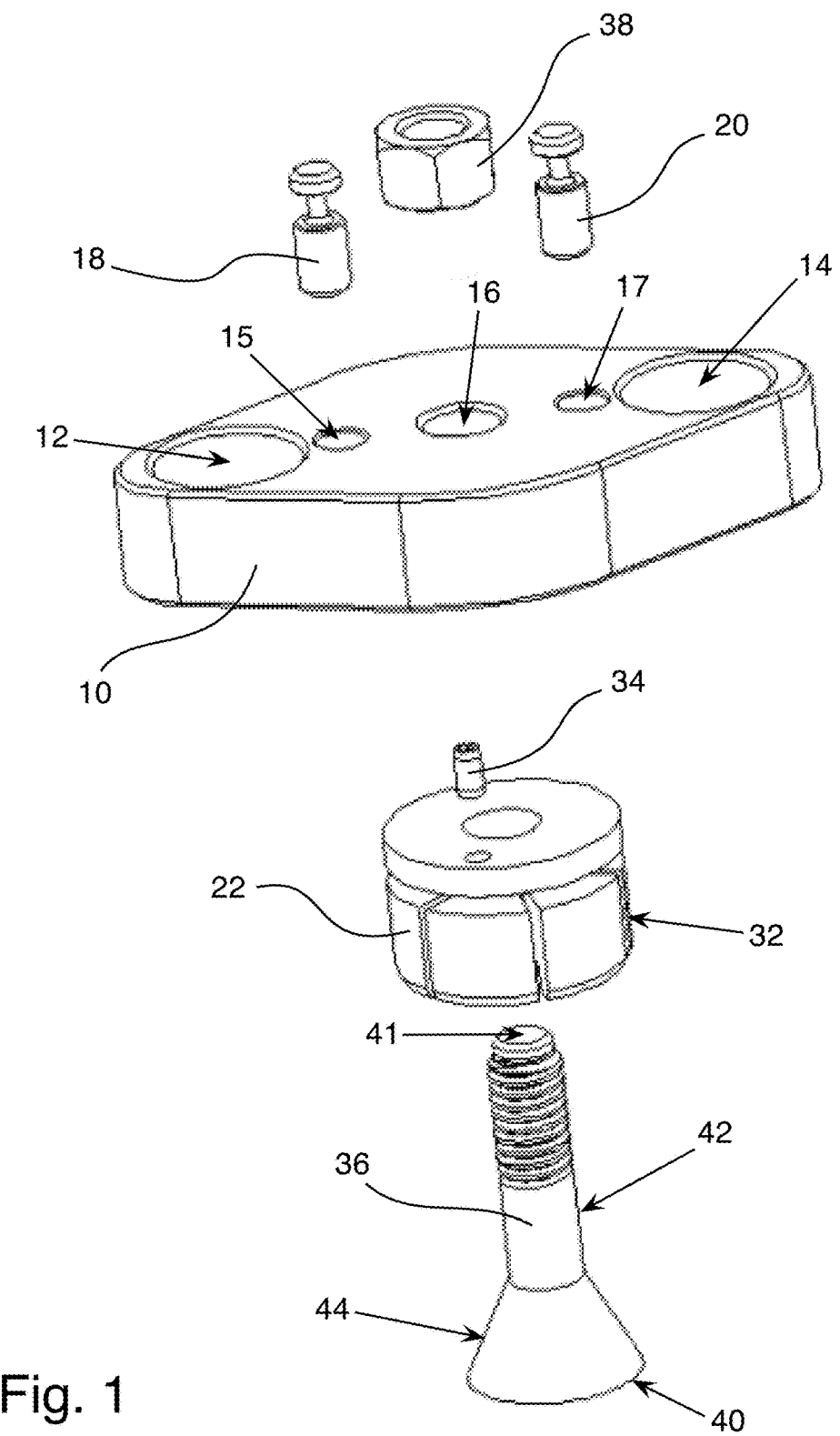
FIG. 1 is an exploded side view of one embodiment of the invention.
Figure 2:
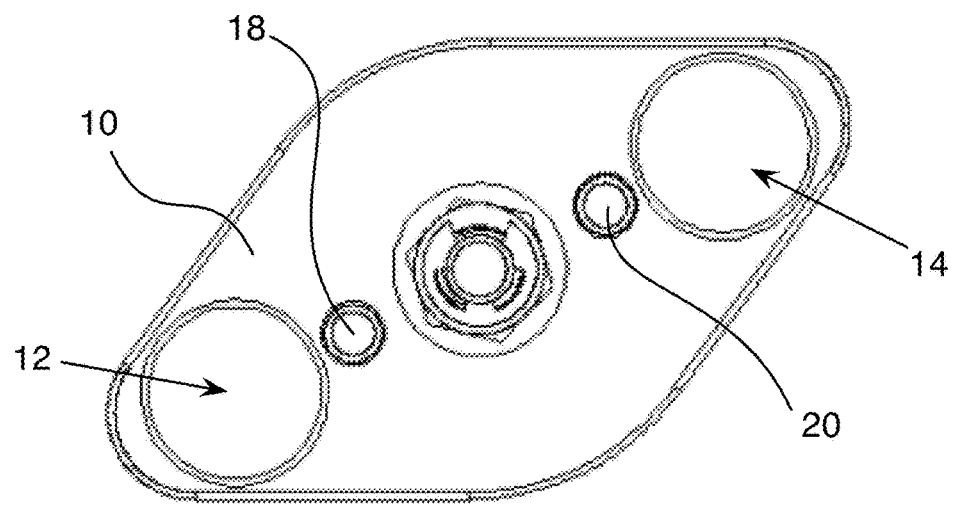
FIG. 2 is a top view of one embodiment of the invention.
Figure 3:
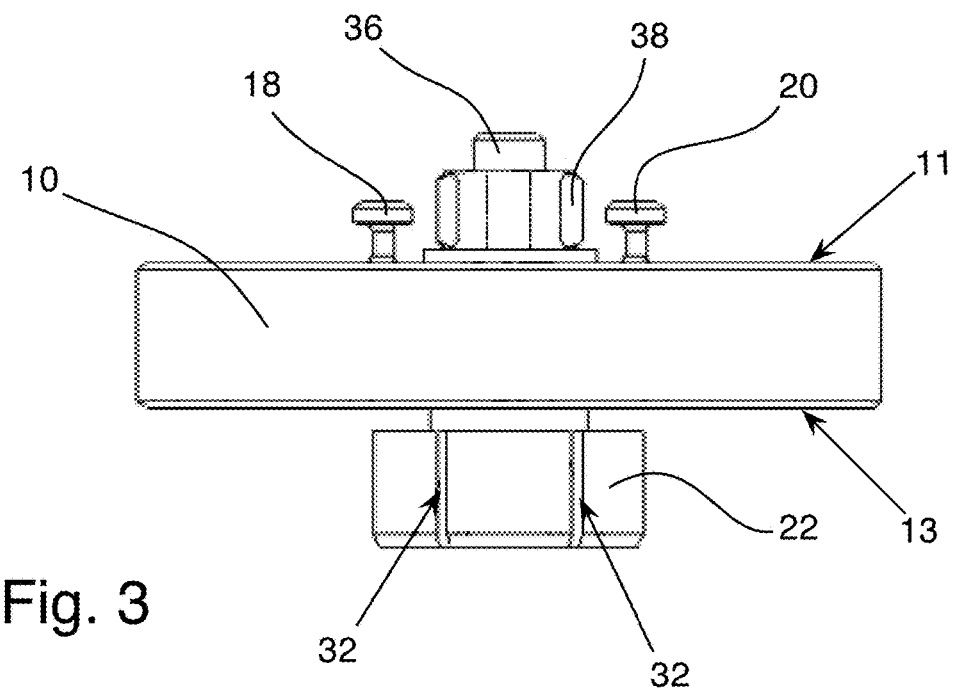
FIG. 3 is a side view of one embodiment of the invention.

As shown in FIGS. 1-3, one embodiment of the invention consists of body 10 that is generally rhomboid in shape (with four curved vertices) and formed from a rigid material, such as type 6061 hard-coated aluminum, for example. Body 10 has two repair holes 12 and 14 oriented perpendicular to the top surface 11 of body 10. Body 10 has a long axis (defined by a line running between the vertices adjacent to repair holes 12 and 14) and a short axis (defined by a line running between the other two vertices and perpendicular to the long axis). At the center of body 10 (at the intersection of the long and short axes) is mounting hole 16. Body 10 is approximately 3.25" long along the long axis, 1.85" wide along the short axis, and 0.625" thick in the direction perpendicular to the plane defined by the long and short axes. While this embodiment has a body with a generally rhomboid shape, other body shapes (such as rectangular, square, or other geometric or non-geometric shapes) could be used and fall within the scope of the invention.

As shown in FIG. 2, repair holes 12 and 14 are approximately 0.75" in diameter and are centered on either side of the center of body 10 along the long axis. The centers of each repair hole are separated by approximately 2.376", to correspond to the bolt separation on a 6.7 L Ford diesel EGR pipe. Different number of holes, hole sizes, hole shapes (rectangular, square, hexagonal, etc.), and hole spacings (either more or less or bigger or smaller) could be used to correspond to the particular component that the embodiment is designed to repair. More specifically, an embodiment of the invention could have only one repair hole, for example.

Figure 7:
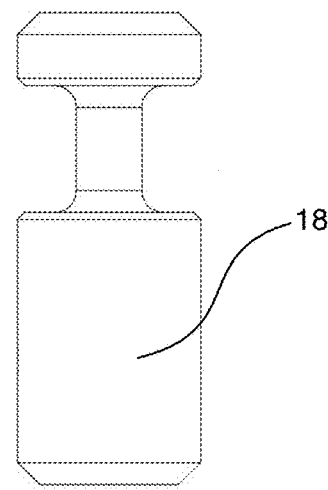
FIG. 7 is a side view of a pin.

As shown in FIGS. 1-3, mounting pins 18 and 20 are located between repair holes 12 and 14 and mounting hole 16. Pins 18 and 20 are also made from a rigid material, such as type 304 stainless steel, for example. Pins 18 and 20 extend outward perpendicularly from top surface 11 of body 10 by approximately 0.275". As shown in FIG. 7, pins 18 and 20 are approximately 0.25" in diameter at the end furthest from body 10 and are approximately 0.09" in diameter at the end next to and extending from body 10. Pins 18 and 20 can have a further extent that fits into additional holes 15 and 17 in body 10 to attach them to body 10, but pins 18 and 20 can also be formed with or attached to body 10 in a variety of ways, such as being integral with body 10 or welded to body 10, among other things. Pins 18 and 20 provide a mechanism to allow various tools and attachments to be secured to body 10 during the repair process. Therefore, pins 18 and 20 could be different sizes, shapes, dimensions, and locations to accommodate the securing of different tools and attachments and fall within the scope of the invention. In addition, a different number of pins (more or less) could be used, depending on the needs of the operator and the type of component being repaired. More specifically, an embodiment of the invention could have only one mounting pin, for example.

Figure 4:
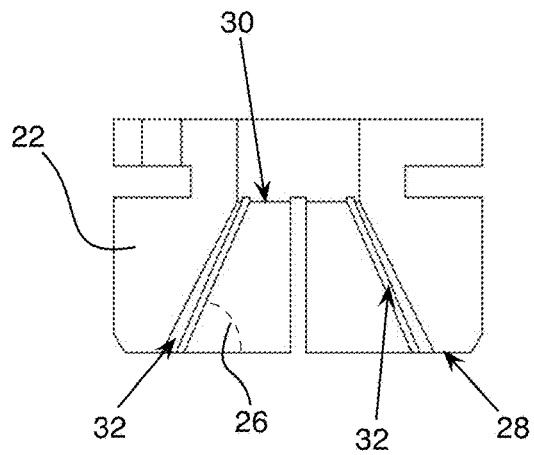
FIG. 4 is a side view of a flange.
Figure 5:
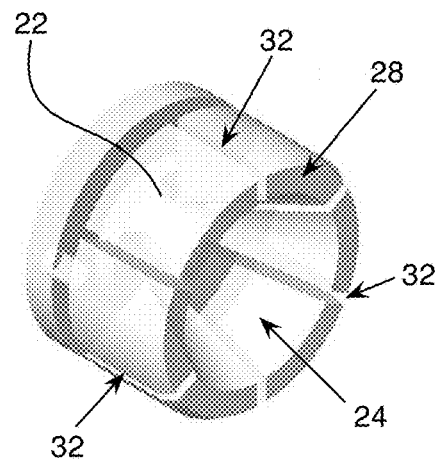
FIG. 5 is a perspective view of a flange.

In order to facilitate the repair of attachment bolts on an EGR pipe, body 10 is secured directly to the interior of the EGR pipe via expandable flange 22 that protrudes from bottom surface 13 of body 10 and is about (or surrounding) mounting hole 16. While mounting hole 16 is circular in cross section in this embodiment, other shapes could be used, such as square, hexagonal, or circular with a flattened side, among other things. As shown in FIGS. 1, 4 and 5, flange 22 is cylindrical in shape with a plurality of slots 32 along the perimeter that allow flange 22 to expand under pressure and lock into the inside surface of the EGR pipe. In this particular embodiment, flange 22 is made from a dense polymer such as Nylon or Delran (although other expandable materials could be used) and is approximately 1.18" in diameter and 0.75" thick. As shown in FIG. 5, the inside portion 24 of flange 22 is frustoconical in shape and slopes inward (i.e., the diameter of the opening at outside surface 28 of flange 22 is larger than the opening at inside portion 30 of flange 22) with a slant angle 26 of 63.5°. It has been found that this slant angle provides for the optimal performance to attach body 10 to the EGR pipe, although other slant angles could also be used and fall within the scope of the invention. An optimal range of slant angle 26 has been found to be between 55° and 65°. Again, other types and sizes of flanges could be used depending on the specific application.

Figure 6:
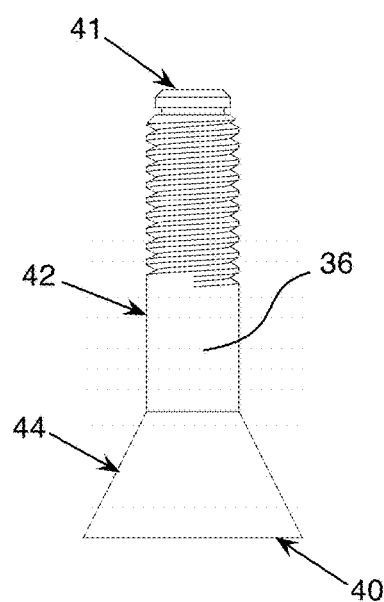
FIG. 6 is a side view of an arbor.

As shown in FIGS. 1 and 3, threaded shaft or arbor 36 then slides through flange 22 and mounting hole 16 in body 10 and is secured by nut 38 on the opposite side of body 10 from flange 22. Arbor 36 is made from type 304 stainless steel, but other rigid materials could also be used. In order to prevent flange 22 from rotating relative to body 10, roll pin 34 is used. Roll pin 34 fits into holes in both bottom surface 13 of body 10 and flange 22 to prevent the rotation of flange 22 relative to body 10. As shown in FIG. 6, threaded arbor 36 is approximately 1.8" long, with a diameter of approximately 0.875" at frustoconical end 40, which is nearest to flange 22 when engaged, and a diameter of approximately 0.37" along shaft 42 towards threaded end 41. Arbor 36 also has a frustoconical portion 44, whose angle matches slant angle 26 of inside portion 24 of flange 22.

To attach body 10 to an EGR pipe, a user first attaches flange 22 to bottom surface 13 of body 10 and then threads arbor 36 through flange 22 and mounting hole 16 before loosely threading nut 38 onto shaft 42 of arbor 36 at top surface 11 of body 10. This entire assembly is placed into the EGR pipe and repair holes 12 and 14 are aligned with the mounting threads on the EGR pipe. Then, nut 38 is tightened on arbor 36, which pushes the frustoconical portion 44 of arbor 36 into the inside portion 24 of flange 22 and expands flange 22 to securely attach the assembly to the interior of the EGR pipe via a frictional connection.

Once body 10 is securely attached to the EGR pipe, various guides and accessories can be attached to body 10 via pins 18 and 20. For example, guide or pilot holes can be attached to pins 18 and 20 that allow an operator to precisely drill holes in the EGR pipe or to insert bushings through repair holes 12 and 14. In this embodiment, the guides and accessories have slots that fit over pins 18 and 20, which securely fix these accessories to body 10 during the repair process. For example, drill bits or taps (among other things) are inserted through repair holes 12 and 14, which are precision machined to accurately guide the tools to the desired location on EGR pipe to facilitate repairs. These tools are removable and interchangeable with other accessories that are designed to be used in subsequent machining steps for removing and repairing all damaged fasteners and fastener remnants (such as drilling out broken fasteners, re-tapping or re-threading holes, and inserting new fasteners, among other things). Once the machining operation is complete, replacement inserts and corresponding fasteners are used to mate to the EGR pipe to complete the repair.

Figure 8:
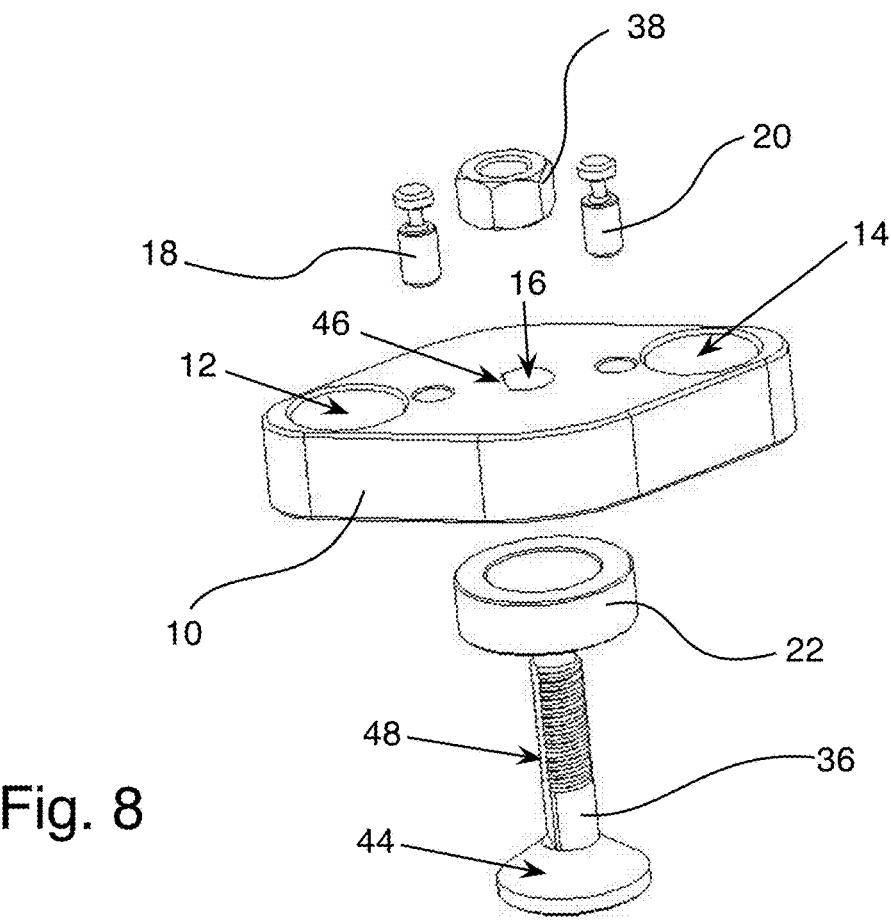
FIG. 8 is an exploded side view of another embodiment of the invention.
Figure 9:
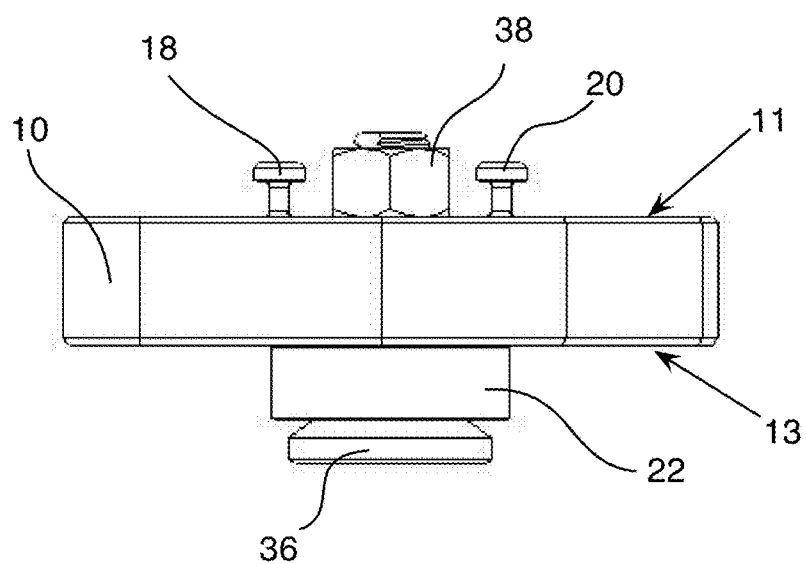
FIG. 9 is a side view of another embodiment of the invention.
Figure 10:
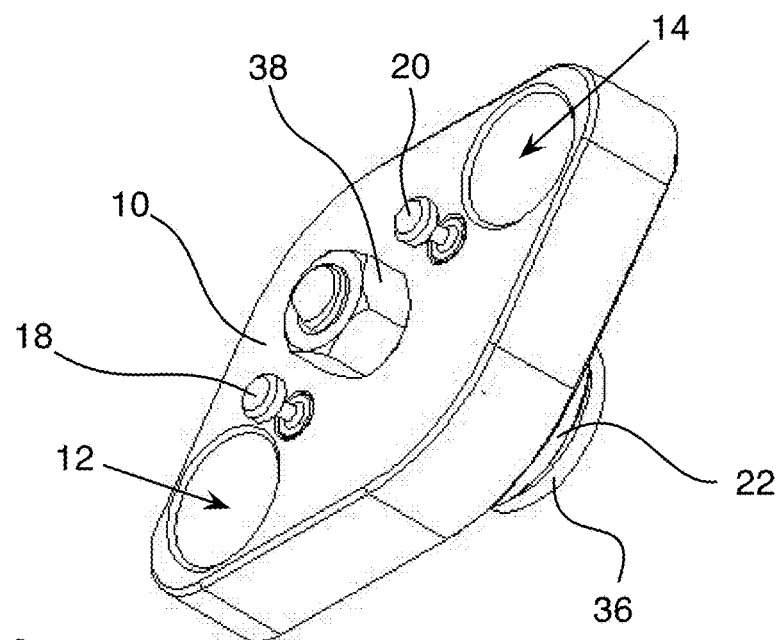
FIG. 10 is a perspective view of another embodiment of the invention.

Another embodiment of the invention is shown in FIGS. 8-10. Body 10 is also generally rhomboid in shape and is 3.25" long along the long axis, 1.85" wide along the short axis, and 0.625" thick in the direction perpendicular to the plane defined by the long and short axes. Two cylindrical repair holes 12 and 14 are located on the long axis near the edge of body 10 and have a diameter of approximately 0.75". Mounting hole 16 lies at the center of body 10 at the intersection of the long and short axes. Mounting hole 16 is a generally cylindrical hole with a flattened portion 46 that can accommodate threaded arbor 36.

Cylindrical flange 22 fits onto bottom surface 13 of body 10, and arbor 36 fits through flange 22 and body 10 to engage nut 38 on top surface 11 of body 10. Both mounting hole 16 and arbor 36 have flattened portions 46 and 48 (respectively) that align together, and flattened portions 46 and 48 prevent arbor 36 from rotating as nut 38 is tightened on arbor 36. As nut 38 is tightened, arbor 36 engages flange 22, which causes flange 22 to expand and engage the inside of the EGR pipe, thereby fixing body 10 to the EGR pipe to facilitate repairs. Both flange 22 and arbor 36 have frusto-conical portions (e.g., portion 44) that mate together as nut 38 is tightened, which causes flange 22 to expand. As with the previous embodiment, pins 18 and 20 protrude from top surface 11 of body 10 and allow various tools and attachments to couple to body 10 to repair the EGR pipe.

As with the prior embodiment, different dimensions, shapes, sizes, and locations of the various components can be used and fall within the scope of the invention. More specifically, an embodiment of the invention could have only one repair hole or one mounting pin, for example.

Figure 11:
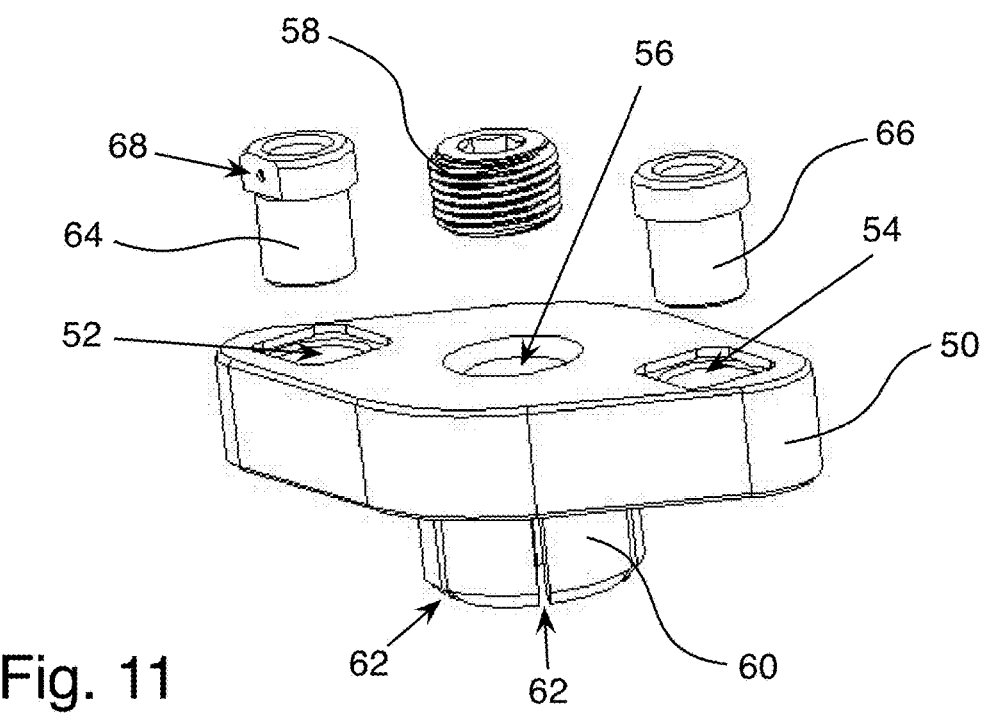
FIG. 11 is an exploded side view of yet another embodiment of the invention.
Figure 12:
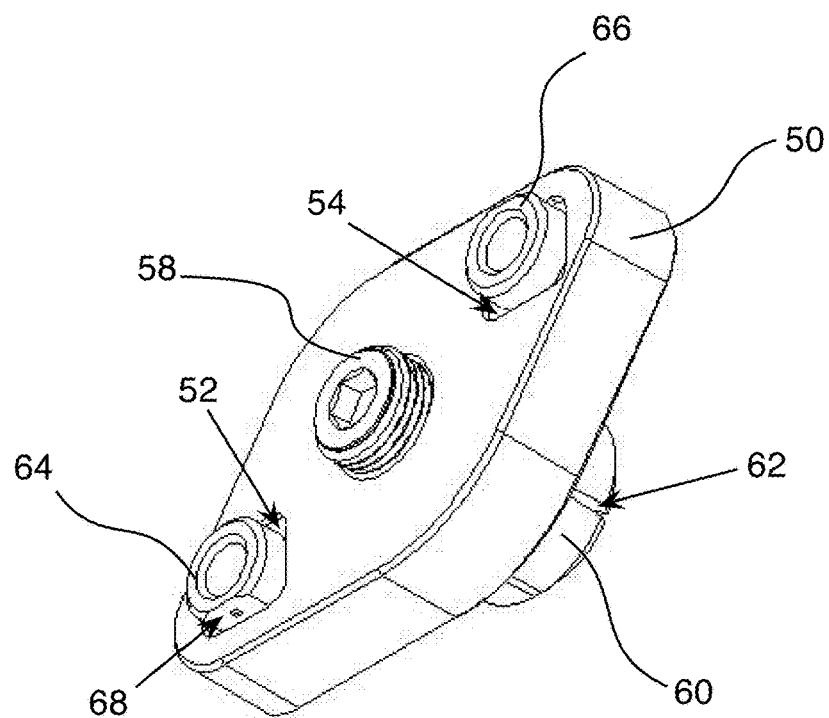
FIG. 12 is a perspective view of yet another embodiment of the invention.
Figure 13:
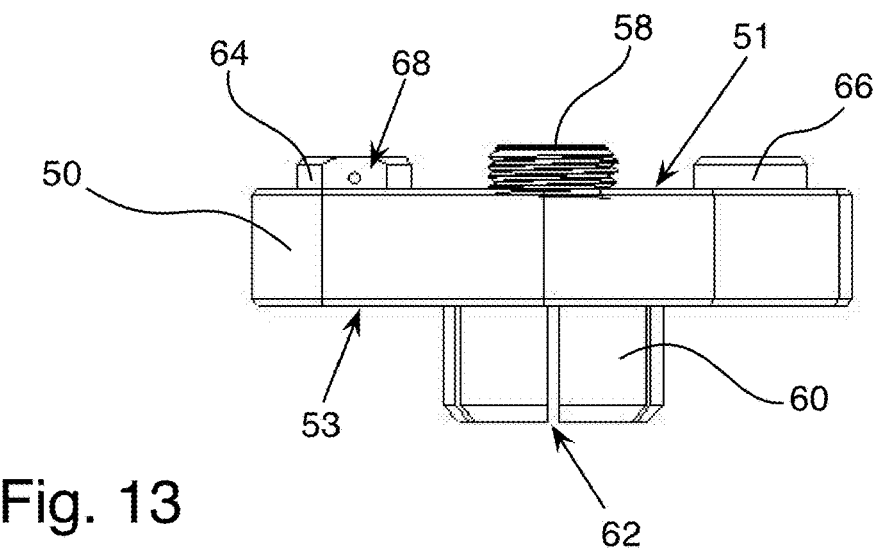
FIG. 13 is a side view of yet another embodiment of the invention.

Another embodiment of the invention is shown in FIGS. 11-13. Body 50 is also generally rhomboid in shape with a long-axis length of approximately 3.5", a short-axis length of approximately 1.9", and a main body thickness of approximately 0.625". Body 50 can be made of a rigid material, such as type 304 stainless steel, for example. Two generally rectangular repair holes 52 and 54 are located on the long axis near the edge of body 50. Repair holes 52 and 54 have cross-sectional dimensions of approximately 0.64"× 0.585". Repair holes 52 and 54 can be of different shapes (square, pentagonal, octagonal, etc.), sizes, and locations and fall within the scope of the invention.

Mounting hole 56 lies at the center of body 50 at the intersection of the long and short axes. Mounting hole 56 is a ⅜" NPT threaded hole that can accommodate plug 58, which is a threaded insert that can be threaded into mounting hole 56 from top surface 51. Note that plug 58 can take other forms (such as a wedge, an expandable member, or other type of threaded piece, among other things), shapes, and sizes and fall within the scope of the invention. As plug 58 is tightened into mounting hole 56, it passes through body 50 and begins to engage flange 60, which is on bottom surface 53 of body 50. Flange 60 is cylindrical in shape with multiple slots 62 along the perimeter that allow flange 60 to expand under pressure and lock into the inside surface of the EGR pipe when engaged by plug 58. In this particular embodiment, flange 60 is made from a dense polymer such as Nylon or Delran (although other expandable materials could be used) and is approximately 1.18" in diameter and 0.625" thick. Body 50 is attached to the EGR pipe in a similar manner as the previous embodiment is.

Various attachments and tools can be inserted into repair holes 52 and 54 by using replaceable mounting sleeves or bushings 64 and 66 to facilitate the repair of the EGR pipe. In one particular example, bushings 64 and 66 are generally cylindrical in shape, but they have a flattened portion 68 along the circumference of the bushings that engages the side of repair holes 52 and 54 to prevent rotation of bushings 64 and 66 during the repair process. The lower cylindrical part of bushings 64 and 66 is approximately 0.5" in diameter, while the upper partially cylindrical part is approximately 0.61" in diameter. Other shapes and sizes of bushings could also be used and fall within the scope of the invention. Various tools and accessories can then be inserted through bushings 64 and 66 to facilitate the repair of the EGR pipe. Bushings 64 and 66 allow for different standardize tools to be used in repair holes 52 and 54, without the need to create specialized tools that specifically fit repair holes 52 and 54. Alternatively, repair holes 52 and 54 could be made to match a particular size of tool, which would eliminate the need for bushings 64 and 66 with that particular tool.

Again, as with the prior embodiment, different dimensions, shapes, sizes, and locations of the various components can be used and fall within the scope of the invention. More specifically, an embodiment of the invention could have only one repair hole or one mounting pin, for example.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A system, comprising:
   an internal combustion engine;
   an EGR assembly connected to the internal combustion engine;
   an apparatus comprising
      a body with a top surface and a bottom surface;
      a repair hole located in the body and extending through the body from the top surface to the bottom surface;
      a mounting hole located in the body;
      a flange protruding from the bottom surface of the body about the mounting hole;
      an arbor extending through the flange and the mounting hole;
      a locking hole in the bottom surface of the body;
      a locking hole in the flange that is offset from the center of the flange; and
      a roll pin located in and extending between the locking hole in the bottom surface of the body and the locking hole in the flange;
      wherein the flange is connected to the inside of the EGR assembly;
   a bushing inside the repair hole; and
   a tool located in the bushing.

2. The system of claim 1, wherein the body is generally rhomboid in shape.

3. The system of claim 1, wherein the flange contains a plurality of slots.

4. The system of claim 1, wherein the arbor is comprised of a threaded end and a frustoconical end.

5. The system of claim 4, further comprising a nut attached to the threaded end of the arbor.

6. The system of claim 4, wherein the frustoconical end has a slant angle between 55° and 65°.

7. The system of claim 1, further comprising a mounting pin extending from the top surface of the body, wherein the bushing couples to the mounting pin.

8. A system, comprising:
an internal combustion engine;
an EGR assembly connected to the internal combustion engine;
an apparatus comprising
 a body with a top surface and a bottom surface, wherein the body is generally rhomboid in shape;
 two repair holes located in the body, each repair hole extending through the body from the top surface to the bottom surface;
 a mounting hole located in the body, wherein the mounting hole is generally cylindrical with a flattened portion along the circumference of the mounting hole;
 two mounting pins extending from the top surface of the body;
 a flange protruding from the bottom surface of the body about the mounting hole, wherein the flange has a plurality of slots;
 an arbor extending through the flange and the mounting hole, wherein the arbor is comprised of a threaded end and a frustoconical end and wherein the threaded end is generally cylindrical with a flattened portion along the circumference of the threaded end; and
 a nut attached to the threaded end of the arbor;
 wherein the flange is connected to the inside of the EGR assembly;
a bushing configured to fit inside the repair hole and to couple to one of the two mounting pins; and
a tool located in the bushing.

9. The system of claim 8, wherein the frustoconical end has a slant angle between 55° and 65°.

10. A system, comprising:
an internal combustion engine;
an EGR assembly connected to the internal combustion engine;
an apparatus comprising
 a body with a top surface and a bottom surface;
 a repair hole located in the body and extending through the body from the top surface to the bottom surface;
 a threaded mounting hole located in the body;
 a flange protruding from the bottom surface of the body about the mounting hole; and
 a threaded plug inserted into the threaded mounting hole;
 wherein the threaded plug engages the flange and wherein the flange is connected to the inside of the EGR assembly;
a bushing configured to fit inside the repair hole; and
a tool located in the bushing.

11. The system of claim 10, wherein the body is generally rhomboid in shape.

12. The system of claim 10, wherein the repair hole is generally rectangular in shape.

13. The system of claim 12, wherein the bushing is generally cylindrical in shape with a flattened portion along the circumference of the bushing.

14. The system of claim 10, wherein the flange contains a plurality of slots.

15. The system of claim 10,
wherein the body is generally rhomboid in shape;
wherein the repair hole is generally rectangular in shape;
wherein the flange contains a plurality of slots; and
wherein the bushing is generally cylindrical in shape with a flattened portion along the circumference of the bushing.

16. The system of claim 10, wherein the tool is one of a drill bit or a tap.

* * * * *